United States Patent
Yang

(10) Patent No.: US 7,213,177 B2
(45) Date of Patent: May 1, 2007

(54) METHOD FOR DETECTING AND ELIMINATING ERRORS IN APPLICATION DATA OF AN ELECTRONIC DEVICE

(75) Inventor: Po-Chun Yang, Tainan Hsien (TW)

(73) Assignee: BenQ Corporation, Gueishan, Tao-yuan Hsien (TW)

( * ) Notice: Subject to any disclaimer, the term of this patent is extended or adjusted under 35 U.S.C. 154(b) by 368 days.

(21) Appl. No.: 10/708,601

(22) Filed: Mar. 14, 2004

(65) Prior Publication Data

US 2005/0204203 A1 Sep. 15, 2005

(51) Int. Cl.
*G06F 11/00* (2006.01)
(52) U.S. Cl. ........................................... 714/42
(58) Field of Classification Search ............. 714/42
See application file for complete search history.

(56) References Cited

U.S. PATENT DOCUMENTS

| | | | |
|---|---|---|---|
| 5,742,548 A * | 4/1998 | Bahout et al. | 365/201 |
| 6,298,443 B1 * | 10/2001 | Colligan et al. | 726/29 |
| 6,412,083 B1 * | 6/2002 | Rothberg et al. | 714/42 |
| 6,446,236 B1 * | 9/2002 | McEwen et al. | 714/795 |
| 2002/0166067 A1 * | 11/2002 | Pritchard et al. | 713/201 |
| 2005/0195653 A1 * | 9/2005 | Conley et al. | 365/185.11 |

FOREIGN PATENT DOCUMENTS

CN 1477801 A 2/2004

* cited by examiner

*Primary Examiner*—Michael Maskulinski
(74) *Attorney, Agent, or Firm*—Winston Hsu

(57) ABSTRACT

A method of detecting and eliminating errors in application data stored in a section of a memory of an electronic device. The method includes providing an application program containing an error checking algorithm in the electronic device, starting the application program to access the application data, and executing the error checking algorithm to check for errors in the application data. The application data is erased if the error checking algorithm detects an error in the application data.

14 Claims, 3 Drawing Sheets

| PHONEBOOK | |
|---|---|
| Bob | 555-0027 |
| Jane | 555-1234 |
| Sue | |
| William | 555-7890 |

Fig. 2

METHOD FOR DETECTING AND ELIMINATING ERRORS IN APPLICATION DATA OF AN ELECTRONIC DEVICE

BACKGROUND OF INVENTION

1. Field of the Invention

The present invention relates to a method for detecting application data errors, and more specifically, to a method for detecting errors in application data of an electronic device and restoring the section of memory in which the application data is located to an initial status.

2. Description of the Prior Art

Whenever software is used to run electronic devices, it is highly likely that application data accessed by the software will become corrupted at some point. The user of the electronic device may inadvertently corrupt the application data while using the software. In addition, other hardware problems such as a memory access error may also corrupt application data.

Unfortunately, the traditional remedy for fixing the corrupted application data is to return the electronic device to the manufacturer. The manufacturer will then use a tool to reset all application data on the electronic device. However, even if only the application data for one application program was corrupted, the manufacturer must still reset the application data for all application programs. Besides the trouble of sending the electronic device back to the manufacturer and losing the application data, having corrupted data also reduces the user's confidence in the electronic device.

SUMMARY OF INVENTION

It is therefore an objective of the claimed invention to provide a method of detecting and eliminating errors in application data of individual application programs in order to solve the above-mentioned problems.

According to the claimed invention, a method of detecting and eliminating errors in application data stored in a section of a memory of an electronic device is disclosed. The method includes providing an application program containing an error checking algorithm in the electronic device, starting the application program to access the application data, and executing the error checking algorithm to check for errors in the application data. The application data is erased if the error checking algorithm detects an error in the application data.

It is an advantage of the claimed invention that the electronic device does not need to be sent back to the manufacturer to eliminate the error in the application data. In addition, only the application data used by a single application program needs to be erased, thereby preserving the application data used by other application programs.

These and other objectives of the claimed invention will no doubt become obvious to those of ordinary skill in the art after reading the following detailed description of the preferred embodiment, which is illustrated in the various figures and drawings.

BRIEF DESCRIPTION OF DRAWINGS

FIG. 2 is a table illustrating an example of corrupted application data.

DETAILED DESCRIPTION

The present invention embeds an error checking algorithm in multiple software application programs run by an electronic device. The present invention can be used in any electronic device in which a memory is used to store application data that is used by software application programs. These electronic devices include (but are not limited to) mobile phones, personal digital assistants (PDAs), computers, and other such devices. For convenience, the following description will use a mobile phone as an example.

Figure 1:
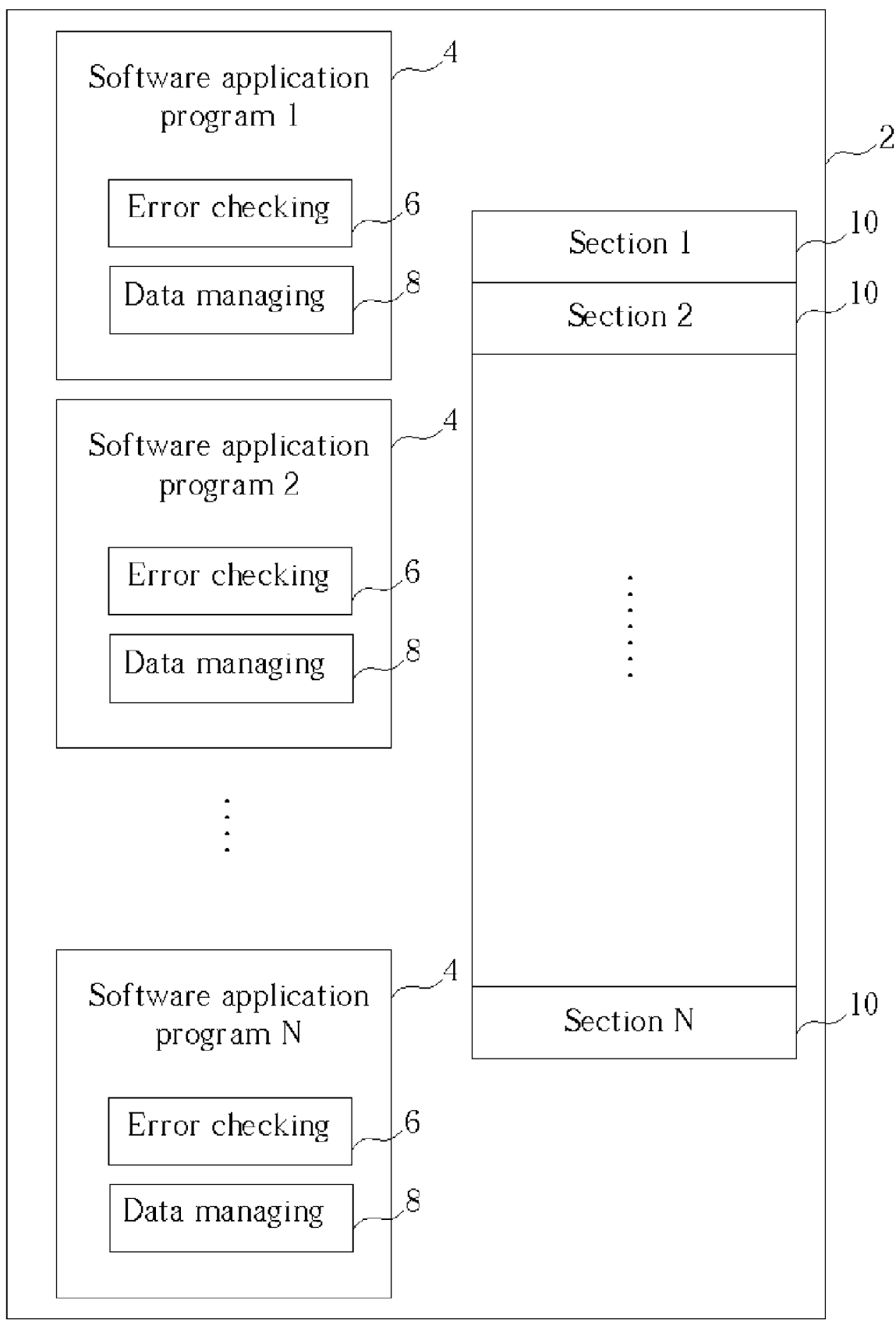
FIG. 1 is a block diagram of contents of a memory of an electronic device according to the present invention.

Please refer to FIG. 1. FIG. 1 is a block diagram of contents of a memory 2 of an electronic device according to the present invention. The memory 2 stores a plurality of software application programs 4 and application data used in the software application programs 4 is stored in a plurality of sections 10 of the memory 2. For example, the section 10 of the memory 2 labeled "section 1" corresponds to the software application program 4 labeled "software application program 1". Therefore, application data stored in the section 10 of the memory 2 labeled "section 1" is used by the software application program 4 labeled "software application program 1". Examples of the software application programs 4 include a phonebook function or a calendar function of a mobile phone. In addition, the present invention also embeds an error checking algorithm 6 and a data managing function 8 inside each software application program 4. Each time one of the software application programs 4 is started, the error checking algorithm 6 is automatically run to detect any errors in the application data accessed by the software application program 4. If no errors are found, then the software application program 4 operates normally. Take the application data stored in the section 10 of memory 2 labeled "section 1" as example. If the error checking algorithm 6 in the software application program 4 labeled "software application program 1" detects an error in its application data, the data managing function 8 will erase the application data and reset the corresponding section 10 of the memory 2 to its initial status. No other sections 10 of the memory 2 are reset if only the application data used by the "software application program 1" is erroneous. In other words, it is not necessary to erase the application data for every software application program 4 used in the electronic device, as was necessary in the prior art.

Please refer to FIG. 2. FIG. 2 is a table illustrating an example of corrupted application data. The table shows application data corresponding to a phonebook software application program. Four names are listed in the phonebook. Normally, each name should have a corresponding phone number associated with the name. However, the name "Sue" does not have a corresponding phone number. This problem could have been caused by a hardware or software problem in the electronic device. When the phonebook software application program is started, the corresponding error checking algorithm 6 would detect this error in the phonebook application data. Thus, the error checking algorithm 6 is able to detect logical errors in the application data that should never occur during normal operation of the corresponding software application program.

Figure 3:
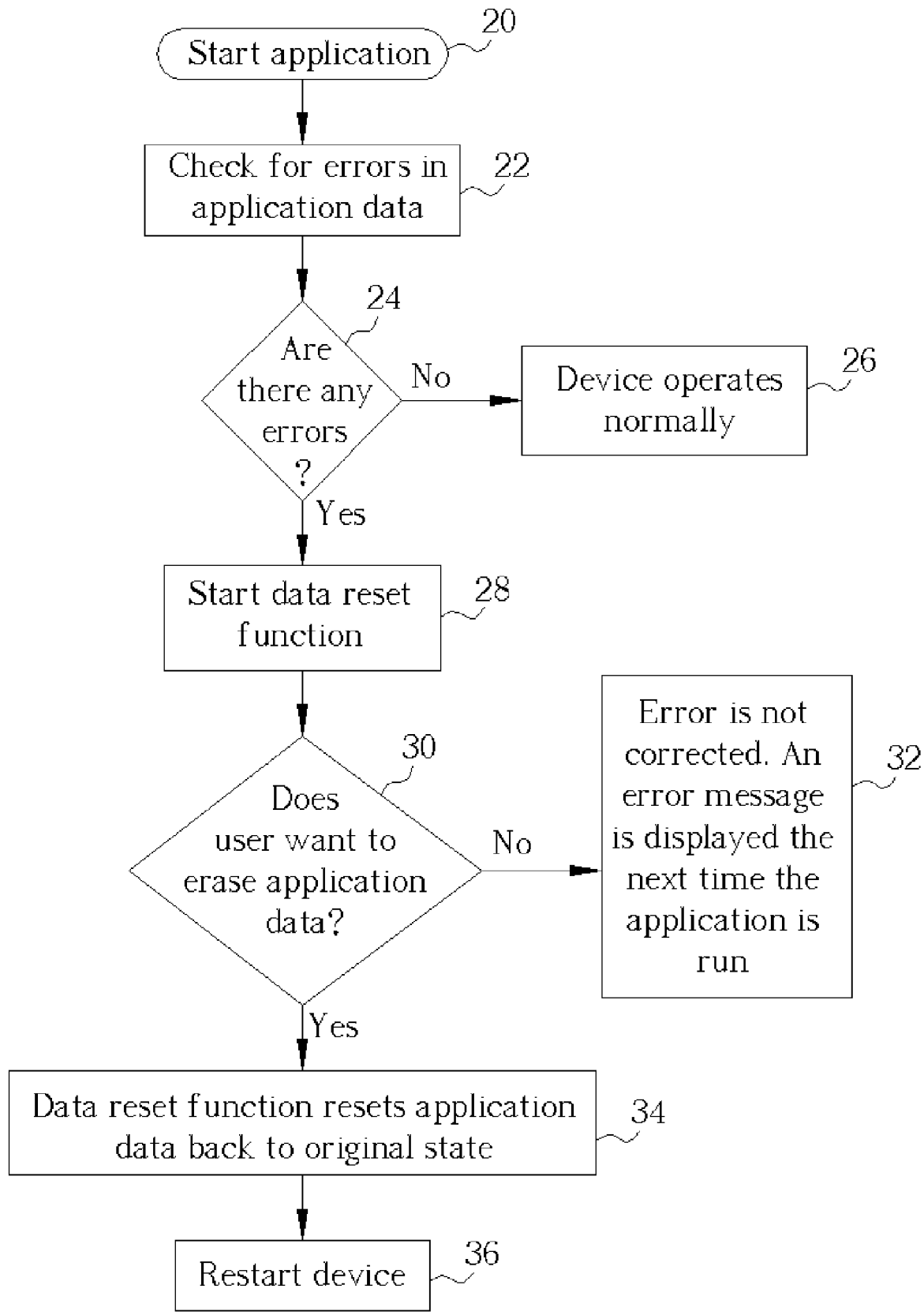
FIG. 3 is a flowchart illustrating detecting errors in application data according to the present invention method.

To better understand operation of the present invention, please refer to FIG. 3. FIG. 3 is a flowchart illustrating detecting errors in application data according to the present invention method. Steps contained in the flowchart will be explained below.

Step 20: Start the software application program 4;

Step 22: The error checking algorithm 6 checks for errors in the application data used by the software application program 4;

Step 24: If the error checking algorithm 6 detects errors in the application data, go to step 28; if not, go to step 26;

Step 26: Since there were no errors detected by the error checking algorithm 6, the electronic device continues to operate the software application program 4 normally;

Step 28: Execute the data managing function 8;

Step 30: Determine if the user of the electronic device wishes to erase the application data used by the software application program 4; if so, go to step 34; if not, go to step 32;

Step 32: Since the error in the application data was not corrected, the electronic device displays an error message the next time the software application program 4 is started to notify the user of the electronic device that there is still an error in the application data;

Step 34: The data managing function 8 erases the application data used by the software application program 4 and resets the section 10 of the memory 2 in which the application data is located to its initial status; and Step 36: The electronic device is restarted to let the changes made to the application data take effect.

To allow data to be reset conveniently, the memory 2 is preferably a non-volatile memory such as flash memory. The use of the present invention method for detecting and removing errors in the application data has many advantages over the prior art. For instance, the errors in the application data are detected as soon as the software application program 4 is started. This increases stability of the software application program 4 by reducing the chances of the software application program 4 crashing while accessing a corrupted memory location in the application data. Moreover, since the user is able to erase the application data immediately, there is no need to return the electronic device to the manufacturer. The user will also have increased confidence in the electronic device since errors will be detected and can be rectified immediately.

Users will commonly go to a service center for upgrading the software running their electronic devices to eliminate any known errors in the software. For users that live in rural areas, it can be a major inconvenience to visit a service center. However, with the present invention, there is less need for the user to immediately upgrade the software since errors can be detected and rectified with the present invention. Therefore, users can choose to wait until a convenient time for upgrading the software on the electronic devices.

In summary, the present invention uses an error checking algorithm to detect errors in application data used by a software application program. The data managing function then erases only the application data used by that software application program. The section of the memory in which the application data located is reset to its initial status. Therefore, the electronic device does not need to be sent back to the manufacturer to eliminate the error in the application data. In addition, only the application data used by a single application program needs to be erased, thereby preserving the application data used by other application programs.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of detecting and eliminating errors in application data stored in a section of a memory of an electronic device, the method comprising:

providing an application program containing an error checking algorithm in the electronic device;

starting the application program to access the application data stored in a section of the memory corresponding to the application program, wherein each application program of the electronic device has a separate section of memory for storing application data;

executing the error checking algorithm to check for errors in the application data; and erasing all of the application data in the section of memory corresponding to the application program when the error checking algorithm detects an error in the application data, wherein the electronic device is restarted after the application data is erased.

2. The method of claim 1 wherein the section of the memory is reset to an initial status after the application data is erased from the section of the memory.

3. The method of claim 1 wherein the memory is a non-volatile memory.

4. The method of claim 3 wherein the memory is a flash memory.

5. The method of claim 1 wherein the electronic device is a mobile phone.

6. The method of claim 1 wherein the electronic device is a personal digital assistant (PDA).

7. The method of claim 1 wherein the electronic device is a computer.

8. A method of detecting and eliminating errors in application data stored in a section of a memory of an electronic device, the method comprising:

providing an application program containing an error checking algorithm in the electronic device;

starting the application program to access the application data stored in a section of the memory corresponding to the application program, wherein each application program of the electronic device has a separate section of memory for storing application data;

executing the error checking algorithm to check for errors in the application data; and erasing all of the application data in the section of memory corresponding to the application program when the error checking algorithm detects an error in the application data, wherein the error checking algorithm determines the error in the application data to be a logical error.

9. The method of claim 8 wherein the section of the memory is reset to an initial status after the application data is erased from the section of the memory.

10. The method of claim 8 wherein the memory is a non-volatile memory.

11. The method of claim 10 wherein the memory is a flash memory.

12. The method of claim 8 wherein the electronic device is a mobile phone.

13. The method of claim 8 wherein the electronic device is a personal digital assistant (PDA).

14. The method of claim 8 wherein the electronic device is a computer.

* * * * *